July 23, 1929.   H. A. WETZEL   1,722,187
WHIPPER FOR CONVERTING LIQUIDS INTO FOAM
Filed Dec. 29, 1926

INVENTOR
Hugo August Wetzel

Patented July 23, 1929.

1,722,187

UNITED STATES PATENT OFFICE

HUGO A. WETZEL, OF FRANKFORT-ON-THE-MAIN, GERMANY.

WHIPPER FOR CONVERTING LIQUIDS INTO FOAM.

Application filed December 29, 1926. Serial No. 157,840.

This invention relates to a whipper for converting liquids into foam or the like, and it is composed of two cones, one being pushed over the other, being held by a shaft, and numerous wires bent bow-shaped, the ends of which are clamped between the cones, and a ring having numerous eyelets. Through each eyelet of the ring one of the wires is passed. The ring is provided for the purpose of bracing the eyelets against each other.

The improvements in the whipper are, that the inner cone has a hexagon head over which the outer cone having a hexagonal hole can be pushed, and further that the shaft provided to drive the whipper has a threaded end, which fits into a thread in the inner cone, and that a nut made of a harder metal than the cone itself is put into the hexagon of the inner cone, so made that it cannot turn in the inner cone, nor be shifted axially, and finally that the ring through which the wires of the whipper pass, is formed out of a single wire with a large number of eyelets.

Figure 1:
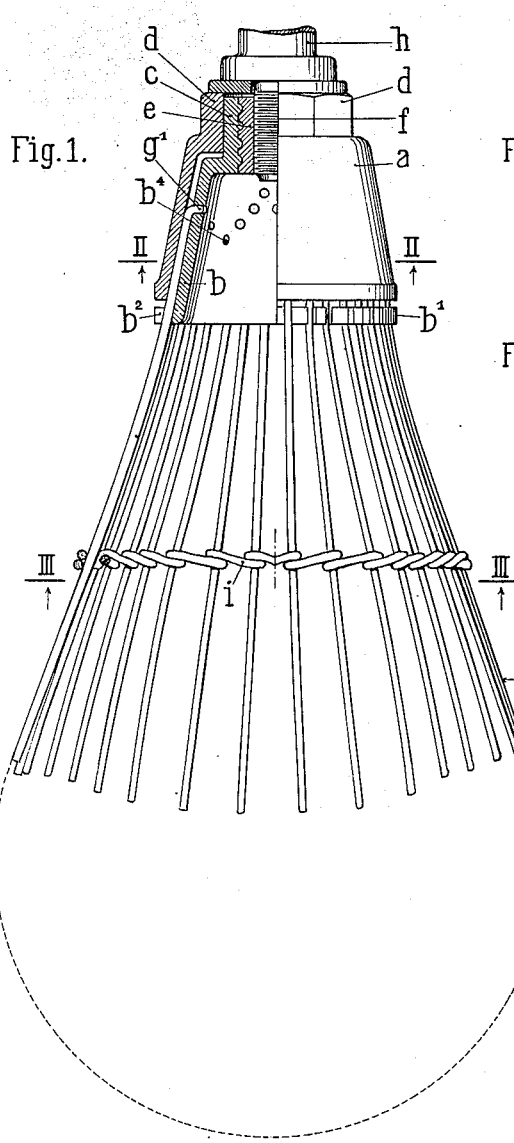
Figure 2:
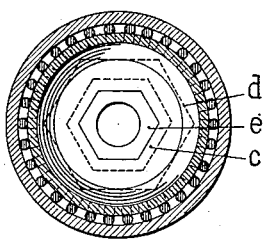
Figure 4:
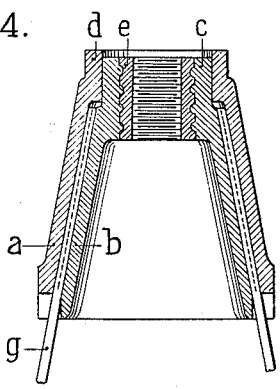
Figure 5:
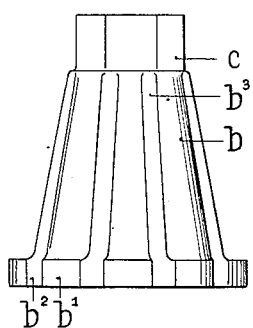
Figure 6:
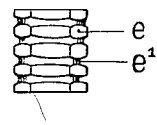

The invention is illustrated diagrammatically and by way of example on the accompanying drawing on which Figure 1 is partly a side view and partly an axial section of the whipper; Figure 2 is a cross-section in the plane II—II of Fig. 1, Figure 3 a cross-section in the plane III—III of Fig. 1, both sections being seen in the directions indicated by the arrows shown at II—II and III—III. Figure 4 is an axial section of both cones of a modification; Figure 5 is a side-view of the inner cone of this modification, and Figure 6 shows a detail also more fully referred to hereinafter.

Figure 3:
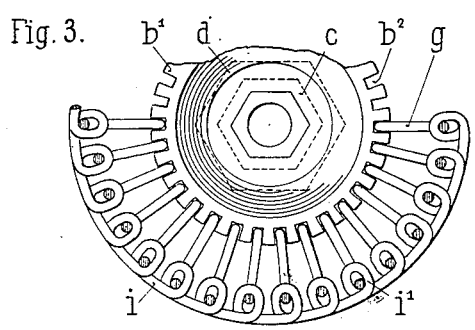

In Figure 1, $a$ is the outer cone and $b$ the inner one. This latter has an extension $c$ which, as shown in Figs. 2 and 3, is hexagonal. The extension $c$ fits into an extension $d$ of the outer cone which has a hexagonal hole into which the extension $c$ of the inner cone fits. The two cones $a$ and $b$ are made of a specifically light metal. A nut $e$ made of harder metal, for instance bronze, is cast into the extension $c$. This nut may also, as shown in the drawing, be hexagonal, but it can also have any other form that will prevent its turning in the extension $c$. The metal of this extension grips into grooves $e^1$ of the nut so that this latter cannot be shifted vertically in the extension. The whipper is driven by the shaft; on the end of this shaft is the thread $f$ which fits into the nut $e$. The ends of numerous wire bows $g$ are clamped between the cones $a$ and $b$.

In order to make it possible to screw the thread $f$ firmly into the nut and thereby clamping the ends of the wires $g$ firmly, the extension $d$ of the outer cone $a$ is also provided outwardly with a hexagon head $d^1$, as shown in Fig. 1. The inner cone $a$ has an outwardly projecting rim $b^1$ in which numerous radially cut grooves are provided. Through each one of these grooves one of the wires of the wire bows $g$ is passed. In order to brace the wire bows at a greater distance from the cones $a$ and $b$ against each other, the ring $i$ is provided which is made of one single wire. This wire is so wound that numerous eyelets $i^1$ are formed. Through each one of these eyelets one wire is passed, as shown in Fig. 3. Hereby a number of the wires lie against the outer bordering surfaces of the eyelets and a number against the inner surfaces in such a manner that the wires lie alternately against the outer and the inner surfaces, as is also shown in Fig. 3. This secures the ring against deformation when in use, or when being cleaned.

The modification shown in Figures 4 and 5 differs from that of Figs. 1–3 in that the inner cone $b$ has not only the projecting rim $b^1$ with the grooves $b^2$, but besides long grooves $b^3$ that pass over into the grooves $b^2$, as shown in Fig. 5. The wires are held still better in this manner than in the form shown in Fig. 1, and it is then not necessary with materials of lesser consistency to provide numerous holes $b^4$ in the inner cone into which the hooked ends $g^1$ of the wire ends grip. Instead of making the extension $c$ with a hexagon head, any other form deviating from the round may be chosen, thereby preventing the turning of the inner cone in the outer one.

I claim:

1. A whipper for converting liquids into foam, comprising, in combination, a hollow body and another body fitting into it, the length of said bodies being equal to their largest diameter; bow-shaped wires, the ends of which are held fast between said bodies; a horizontal ring located remote from said bodies and having as many radially elongated eyes as there are wire bow legs, one leg passing through each one of said eyes.

2. A whipper for converting liquids into foam, comprising, in combination, a hollow body and another body fitting into it, the length of said bodies being equal to their largest diameter; bow-shaped wires, the ends of which are held fast between said bodies; a horizontal ring located remote from said bodies and forming as many helically wound and radially elongated eyes as there are wire bow legs, one leg passing through each one of said eyes.

3. A whipper for converting liquids into foam, comprising, in combination, a hollow body and another body fitting into it; bow-shaped wires, the ends of which are held fast between said bodies; a horizontal ring located remote from said bodies and having as many eyes as there are wire bow legs, one leg passing through each one of said eyes; the length of the eyes in radial direction being greater than the width of the same.

4. A whipper for converting liquids into foam, comprising, in combination, a hollow body and another body fitting into it; bow-shaped wires, the ends of which are held fast between said bodies; a horizontal wire ring located remote from said bodies and forming as many helically wound eyes as there are wire bow legs, the length of the eyes in radial direction being greater than the width of the same, a leg passing through each one of said eyes, these latter being formed by winding the wire of said ring.

In testimony whereof I affix my signature.

H. A. WETZEL.